United States Patent [19]

Schneider

[11] Patent Number: 5,074,731
[45] Date of Patent: Dec. 24, 1991

[54] RADIALLY INSERTABLE SCREW NUT

[75] Inventor: Rudolf Schneider, Stansstad, Switzerland

[73] Assignee: Erowa AG, Reinach, Switzerland

[21] Appl. No.: 548,005

[22] Filed: Jul. 5, 1990

[30] Foreign Application Priority Data

Jul. 12, 1989 [DE] Fed. Rep. of Germany ....... 3922957

[51] Int. Cl.⁵ .............................................. F16B 37/16
[52] U.S. Cl. ..................................... 411/437; 411/310; 411/938
[58] Field of Search ............... 411/433, 437, 310, 311, 411/436, 938

[56] References Cited

U.S. PATENT DOCUMENTS

| | | | |
|---|---|---|---|
| 781,571 | 1/1905 | Thomas | 411/437 |
| 1,375,781 | 4/1921 | DeLong | |
| 4,594,039 | 6/1986 | Wizte | 411/311 |

FOREIGN PATENT DOCUMENTS

| | | | |
|---|---|---|---|
| 1046410 | 12/1958 | Fed. Rep. of Germany | 411/433 |
| 7146313 | 3/1972 | Fed. Rep. of Germany | |
| 8601266 | 2/1986 | PCT Int'l Appl. | |
| 8707928 | 12/1987 | PCT Int'l Appl. | |

*Primary Examiner*—Neill R. Wilson
*Attorney, Agent, or Firm*—Tarolli, Sundheim & Covell

[57] ABSTRACT

The invention provides a screw nut comprising a central inner thread and a radially extending slit, the width thereof essentially corresponding to the diameter of the central inner thread. Thus, a threaded bolt or a threaded stud can be radially inserted into said screw nut body. In order to avoid that the screw nut is displaced away from the threaded bolt or stud during tightening of the screw nut, the central inner thread comprises a plurality of thread turns provided with axially extending recesses directed towards the end surface of the screw nut which is under load when the screw nut is tightened on the threaded bolt or stud.

4 Claims, 2 Drawing Sheets

RADIALLY INSERTABLE SCREW NUT

BACKGROUND OF THE INVENTION

1. Field of the Invention

The present invention refers to a screw nut comprising a screw nut body, a central inner thread provided in said screw nut body and a radially extending slit provided in said screw nut body, the width of said radially extending slit essentially corresponding to the diameter of said central inner thread, and being adapted to enable a threaded bolt or a threaded stud to be radially inserted into said screw nut body.

Such a screw nut can be engaged with a threaded bolt or a threaded stud at any arbitrary position of the thread thereof, whereby the need is removed to laboriously turn the nut onto a long bolt or stud until a desired position is reached.

Furthermore, the invention refers to a method of manufacturing a screw nut comprising a screw nut body, a central inner thread provided in said screw nut body a radially extending slit provided in said screw nut body and having a first and a second side wall, the width of said radially extending slit essentially corresponding to the diameter of said central inner thread, and being adapted to enable a threaded bolt or a threaded stud to be radially inserted into said screw nut body, whereby said central inner thread comprises a plurality of thread turns provided with axially extending recesses directed towards the end surface of the screw nut which is under load when said screw nut body is tightened on said threaded bolt and threaded stud, respectively.

2. Prior Art

According to the publication PCT-WO 86-01266, a two-piece screw nut is disclosed which put on a threaded stud at any arbitrary position of said threaded stud. For this purpose, a screw nut is described which comprises two segment or half moon shaped parts which are put around the threaded stud and snapingly lock to each other such that the screw nut so formed can be tightened on the threaded stud. The disadvantage of this screw nut is that it is time-consuming and expensive to manufacture, troublesome to handle and that it can be loosened only by means of a special tool.

A three-piece screw nut which can be put on a threaded bolt at any arbitrary position thereof without the need to screw it on the stud from the end is disclosed in the publication PCT-WO 87-07928. It comprises two parts which together really form the screw nut, i.e. a screw nut which is divided into two halves by a plane running through the central axis plane of it. The two halves are provided with an outer thread adapted to receive a locking nut. The two halves of the real nut are put around the threaded stud in the desired position, then the locking nut is put over the end of the threaded stud and displaced towards the two halves of the real nut, and finally the locking nut is screwed onto the outer thread of the two halves of the real screw nut. Also in this case, a complicated and, thus, expensive manufacture is required. A further disadvantage is that the locking nut must be put over the end of the threaded stud; consequently, this design cannot be used of the end of the threaded stud is not freely exposed or easily accessible.

According to U.S. Pat. No. 1,375,781, a one-piece screw nut is disclosed which can be put on a threaded bolt at any arbitrary position thereof. For this purpose, the screw nut comprises a radially running slit opening into a centrally arranged bore. The central bore is provided with thread turns extending over not more than half of its circumference. It must be admitted that this screw nut is of simple design and the handling thereof is easier than the one of the screw nuts described hereinbefore. However, the disadvantage is that this screw nut has the tendency, upon tightening, to move radially away from the threaded bolt with the consequence that only a very small part of the thread of its central bore engages the thread of the bolt. Even if this screw nut is made of heavy duty steel material, it is suited only for low torques.

Finally, the German Utility Model Nr. 71 46 313 discloses a screw nut which can be put onto the thread of a threaded bolt or stud at any arbitrary location as well. With this design, the tendency that the screw nut radially displaces from the threaded stud or bolt upon tightening, however, is less because the slit provided in the screw nut has less width than the diameter of the threaded bolt or stud. On the other hand, in order to enable the screw nut to be placed on the thread of the bolt or stud, the screw nut body must be made of elastically resilient material. This fact, however, limits the maximally applicable torque to a comparatively low value upon tightening the screw nut, because the screw nut cannot be manufactured of a heavy duty steel material as, in that case, the forces required to elastically deform the screw nut upon placing it onto the threaded stud or bolt would be much too high.

OBJECTS OF THE INVENTION

It is an object of the invention to provide a screw nut adapted to be placed on a threaded bolt or stud at any arbitrary position thereof which avoids the disadvantages of the prior art screw nuts discussed hereinabove.

Particularly, it is an object of the invention to provide a screw nut adapted to be placed on a threaded bolt or stud at any arbitrary position thereof which is very simple in its design and, thus, can be manufactured at low costs, but which does not have the tendency to move away from the threaded bolt or stud during tightening.

Still further, it is an object of the invention to provide a screw nut adapted to be placed on a threaded bolt or stud at any arbitrary position thereof which can be tightened to very high torque values and, simultaneously, can be placed on a threaded bolt or stud without effort.

Finally, it is an object of the present invention to provide a method of manufacturing such an aforementioned screw nut quickly and at low costs.

SUMMARY OF THE INVENTION

In order to meet the aforementioned and other objects of the invention, there is provided, according to a first aspect, a screw nut comprising a screw nut body, a central inner thread provided in the screw nut body, and a radially extending slit provided in the screw nut body. The width of the radially extending slit essentially corresponds to the diameter of the central inner thread such that a threaded bolt or a threaded stud can be radially inserted the said screw nut body.

The central inner thread comprises a plurality of thread turns provided with axially extending recesses directed towards the end surface of the screw nut which is under load when the screw nut body is tightened on the threaded bolt and threaded stud, respectively. Thereby, the danger is completely avoided that the screw nut is displaced radially away from the threaded bolt or stud upon tightening of the screw nut.

According to a preferred embodiment, in the screw nut of the invention, the radially extending slit in the screw nut body comprises a first and a second side wall which both are provided with a plurality of parallel grooves. The cross-section of these parallel grooves essentially corresponds to the cross section of the central inner thread provided in the screw nut body. The one ends of the grooves adjoin the thread turns of the central inner thread.

In order that the screw nut body is aligned exactly perpendicularly to the axis of the threaded stud or bolt, the parallelly running grooves of the first side wall are offset in height by half the amount of the axial pitch of the central inner thread with reference to the parallelly running grooves of the second wall.

Preferably, the depth of the axially extending recesses amounts to 10-30% of the axial pitch of the central inner thread in order to ensure that the screw nut is forced against the threaded bolt or stud during tightening the screw nut.

Since, to ensure this desired effect, the screw nut shall be positioned on the threaded bolt or stud only in a predetermined orientation, the surface of the screw nut located opposite to the end surface which is under load when the screw nut is tightened on the threaded bolt or stud is marked by a different shaping and/or by an optical mark.

According to a second aspect of the invention, there is provided a method of manufacturing a screw nut comprising a screw nut body, a central inner thread provided in the screw nut body, and a radially extending slit provided in the screw nut body. The radially extending slit has a first and a second side wall, the width of the radially extending slit essentially corresponding to the diameter of the central inner thread. Thus, the screw nut is adapted to enable a threaded bolt or a threaded stud to be radially inserted into the screw nut body.

The central inner thread comprises a plurality of thread turns provided with axially extending recesses directed towards the end surface of the screw nut which is under load when said screw nut body is tightened on the threaded bolt or stud.

According to the invention, the method comprising the following steps:
Providing a screw nut body;
Drilling a central hole into the screw nut body;
Milling or cutting a radially extending slit into the screw nut body;
Consecutively milling parallel grooves in said first and second side walls of the radially extending slit, and milling the thread turns in the central bore by means of a milling cutter tool means; and
Displacing the milling cutter tool means in axial direction by a predetermined amount after the thread turns in the central bore have been milled in order to mill said axially extending recesses.

In order to achieve a quick and economical manufacture of the screw nut, the milling of the parallel grooves in the side walls of the radially extending slit, the milling of the thread turns in the central bore and the additional milling of the thread turns in the central bore to provide said axially extending recesses is done consecutively with the same milling cutter tool.

BRIEF DESCRIPTION OF THE DRAWINGS

In the following, an embodiment of the screw nut according to the invention will be further described, with reference to the accompanying drawings, in which.

DETAILED DESCRIPTION OF A PREFERRED EMBODIMENT

Figure 1:
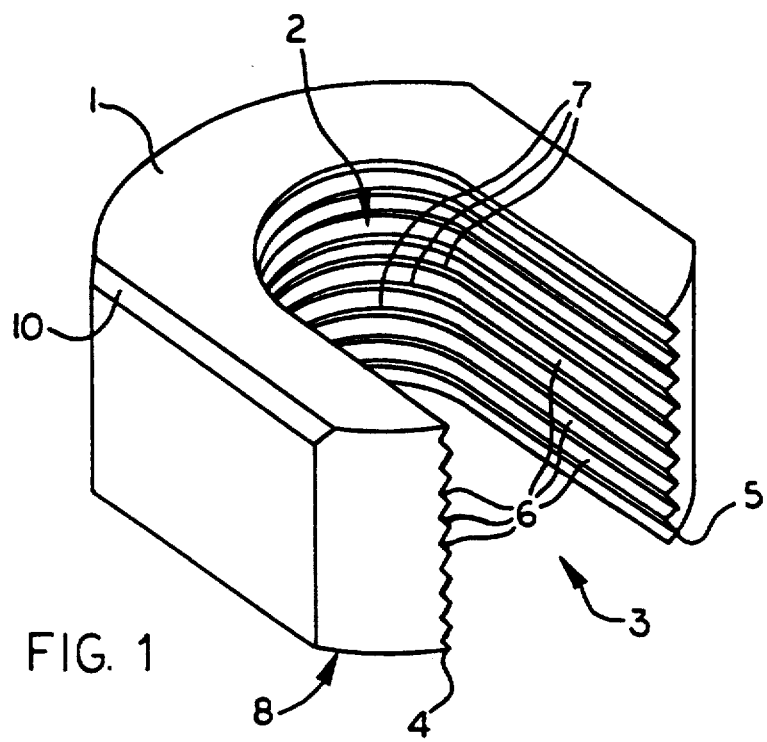
FIG. 1 shows a schematic perspective view of a screw nut of the invention.

The screw nut of the invention comprises, as can be seen in FIG. 1, a screw nut body 1 having a central inner thread 2 as well as a radially extending slit 3 open towards the outside of the screw nut body and incorporating two parallel side walls 4 and 5. The width of the slit 3 essentially corresponds to the diameter of the inner central bore 2 such that the screw nut body 1 can be put onto the thread of a (not shown) threaded bolt or stud at any arbitrary position along its threaded bolt or stud portion.

The inner surfaces of the side walls 4 and 5 of the slit 3 are provided with a plurality of grooves 6 running essentially parallel to each other and extending perpendicularly to to central axis of the screw nut body 1. The profile of the grooves 6 corresponds to the thread profile of the aforementioned central inner thread 2.

Figure 2:
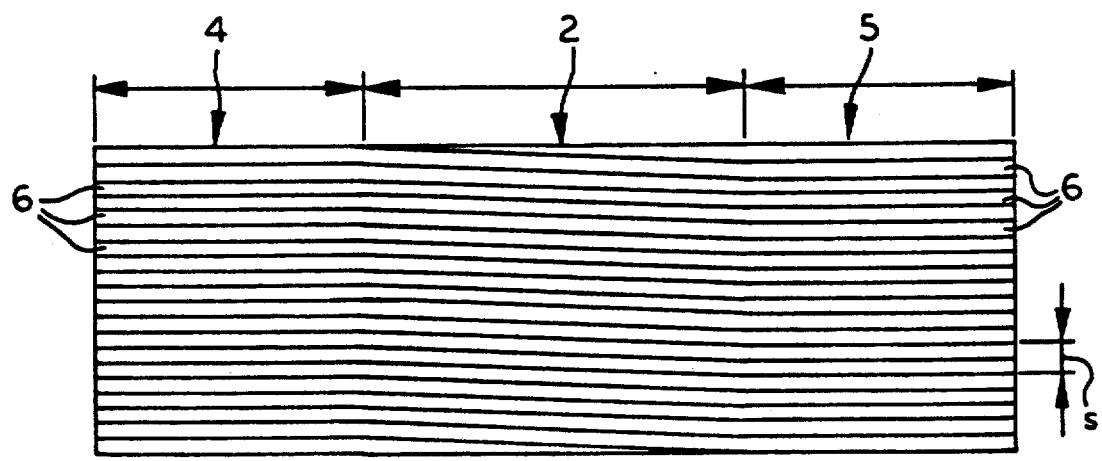
FIG. 2 shows a developed view of the central thread bore and of the adjacent side walls of the radially extending slit.

As can be clearly seen from FIG. 2, the grooves 6 provided in the side wall 4 of the slit 2 are offset by an amount corresponding half to the pitch s of the central inner thread 2 with reference to the grooves 6 provided in the side wall 5 of the slit 2. Thereby, a misalignment of the screw nut body 1 during its placement onto the (not shown) threaded bolt or stud is avoided since the oppositely located thread turns of the threaded bolt or stud are, as well, offset to each other by the same amount.

Figure 3:
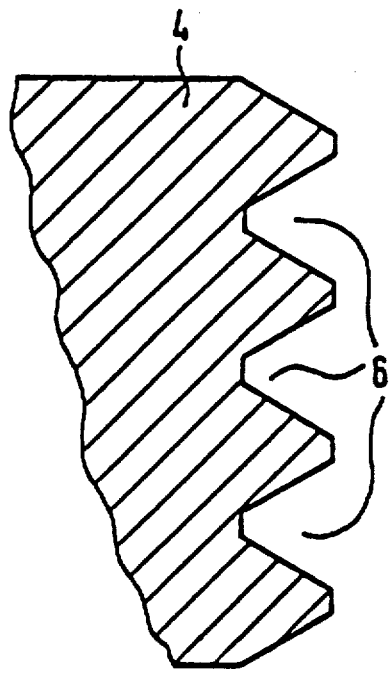
FIG. 3 shows a partial axial sectional view of one of the side walls of the radially extending slit.

The sectional view of FIG. 3 clearly shows that the profile of the inner side wall 4 exactly corresponds to the geometry of a standard thread. It is understood that the side wall 4 corresponds, in shape, to the geometry of the central inner thread 2. The same is true, of course, relating to the side wall 5.

Figure 4:
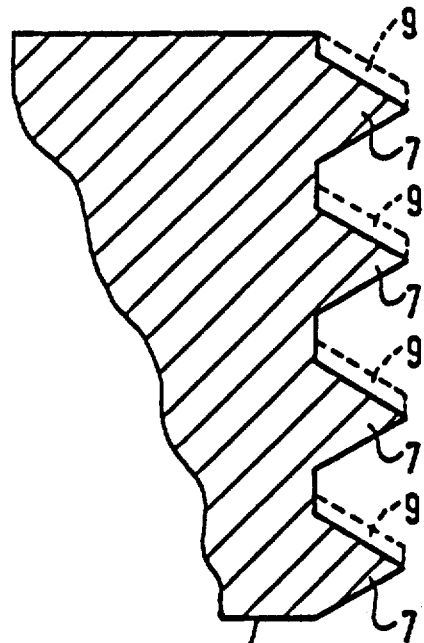
FIG. 4 shows a partial axial sectional view of the side wall of the central threaded bore.
Figure 5:
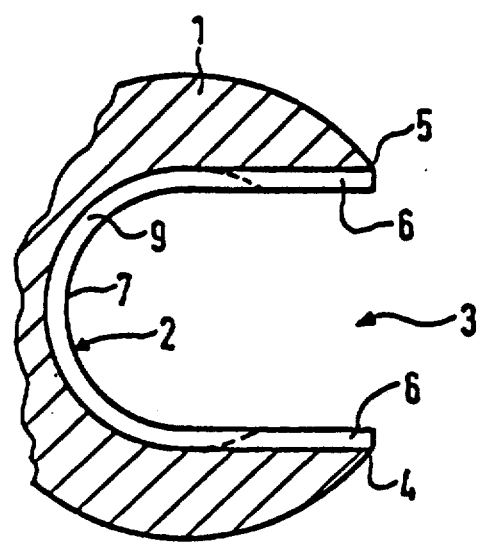
FIG. 5 shows a horizontal sectional view of the screw nut.

As can be seen from FIGS. 4 and 5, the thread turns 7 of the inner central bore 2 are provided with recesses 9 extending towards that end surface 8 of the screw nut 1 which will be under load as soon as the screw nut body is tightened against a (not shown) workpiece. These recesses have a depth which amounts to approximately 10-30% of the thread pitch. The weakening of the thread resulting thereof is minimal and can be neglected in most cases.

As can be clearly seen from FIG. 5, the aforementioned recesses 9 extend over a little more than a semicircle. The result is that a guided or inevitable centering effect occurs as soon as the screw nut positioned on the threaded bolt or stud is tightened, such that the screw nut cannot move radially away from the center of the threaded bolt or stud. If such movement away from the center of the bolt or stud would occur, only a small part of the thread of the screw nut would remained engaged with the thread of the threaded bolt or stud, thus weakening the connection between screw nut and threaded bolt or stud.

It is essential that the screw nut shall be positioned the right way round with reference to the threaded bolt or stud, i.e. the surface of the screw nut 1 facing the recesses 9 being the loaded surface upon tightening the screw nut. For this purpose, the opposite, i.e. the free, unloaded surface of the screw nut is provided with a suitable kind of marking; according to the embodiment shown in FIG. 1, said opposite free surface is chamfered as shown by reference numeral 10. It is understood that other possibilities of marking can be applied, e.g. a different color or engraving.

Preferably, the manufacture of the screw nut is performed by an especially designed milling cutter tool. Starting with a screw nut blank provided with a core bore having a diameter suitable for the thread to be realized in the center of the screw nut, a radially extending slit is cut or milled into said screw nut blank, said slit having a width which essentially corresponds to the diameter of said core bore.

Thereafter, the milling cutter tool having a diameter which is less than the diameter of said core bore and, thus, less than the width of the radially extending slit, is displaced in constant axial position along the inner side wall 4 of the slit 3, the path of displacement of the milling cutter tool extending perpendicularly to the central axis of the screw nut blank; thereby, the grooves 6 in the inner side wall 4 are milled.

In a next step, the milling cutter tool is displaced along the inner side wall of the central core bore on a circular path and simultaneously and continuously displaced in axial direction to such an amount that during its displacement along a semicircle an axial displacement is performed which corresponds to half of the pitch of the thread.

In a still further step, the milling cutter tool which is now located at the back end of the inner side wall 5 of the radially extending slit 3 is displaced linearly towards the front end of the side wall 5 of the radially extending slit 3 whereby the axial position of the milling cutter tool is kept constant. In this way, the grooves 6 in the inner side wall 5 are milled.

Finally, the milling cutter tool is repositioned to the transition of the inner side wall 4 of the slit 3 to the inner thread 2 and its axial position is altered with reference to the position in which the milling of the inner thread 2 has begun by a small amount in the region of 10-30% of the pitch of the inner thread 2. Now, the axially extending recesses 9 can be milled by displacing the milling cutter tool along a semicircle and simultaneously altering continuously its axial position up to an amount corresponding to half of the pitch of the inner thread 2.

The entire machining of the inner side walls 4 and 5 as well as of the central bore is done by means of the same milling cutter tool. Thus, the manufacturing of the screw nut according to the invention can be easily automated and can be performed very quickly, e.g. in the case of a screw nut made of heavy duty steel within appr. 3-5 seconds.

What I claim is:

1. A screw nut comprising:
    a screw nut body;
    a central inner thread provided in said screw nut body;
    a radially extending slit provided in said screw nut body, the width of said radially extending slit essentially corresponding to the diameter of said central inner thread, and being adapted to enable said screw nut body to be radially inserted into a threaded bolt or threaded stud; and
    said central inner thread comprising a plurality of thread turns provided with axially extending recesses extending circumferentially over more than a semicircle of the circumference of said screw nut body and being directed towards an end surface of the screw nut which is under load when said screw nut body is tightened on said threaded bolt or threaded stud, each of said recesses having circumferentially spaced ends, both ends of each of said recesses ending in said radially extending slit.

2. A screw nut according to claim 1 in which said radially extending slit in said screw nut body comprises a first side wall and a second side wall which both are provided with a plurality of parallel grooves, the cross-section thereof essentially corresponding to the cross-section of said central inner thread provided in said screw nut body, the one ends of said grooves adjoining said thread turns of said central inner thread, whereby the parallelly running grooves of said first side wall are offset in height by half the amount of the axial pitch of said central inner thread with reference to the parallelly running grooves of said second side wall.

3. A screw nut according to claim 1 in which the depth of said axially extending recesses amounts to 10-30% of the axial pitch of said central inner thread.

4. A screw nut according to claim 1 in which a surface of the screw nut located opposite to said end surface which is under load when said screw nut is tightened on said threaded bolt or threaded stud is marked by a different shaping and/or by an optical mark.

* * * * *

UNITED STATES PATENT AND TRADEMARK OFFICE
CERTIFICATE OF CORRECTION

PATENT NO. : 5,074,731

DATED : December 24, 1991

INVENTOR(S) : Rudolf Schneider

It is certified that error appears in the above-identified patent and that said Letters Patent is hereby corrected as shown below:

Column 6, Line 21, Claim 1, change "into" to --onto--.

Signed and Sealed this

First Day of February, 1994

Attest:

BRUCE LEHMAN

Attesting Officer

Commissioner of Patents and Trademarks